(12) United States Patent
Schroeder et al.

(10) Patent No.: US 10,913,217 B2
(45) Date of Patent: Feb. 9, 2021

(54) METHOD AND DEVICE FOR SERIES PRODUCTION OF COMPONENTS MADE OF A FIBER-REINFORCED COMPOSITE MATERIAL

(71) Applicant: Airbus Operations GmbH, Hamburg (DE)

(72) Inventors: Rene Schroeder, Hamburg (DE); Ciro Farinelli, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 696 days.

(21) Appl. No.: 15/192,264

(22) Filed: Jun. 24, 2016

(65) Prior Publication Data
US 2016/0375613 A1    Dec. 29, 2016

(30) Foreign Application Priority Data

Jun. 24, 2015    (DE) .................... 10 2015 211 670

(51) Int. Cl.
*B29C 70/42*      (2006.01)
*B29D 99/00*      (2010.01)
(Continued)

(52) U.S. Cl.
CPC .............. *B29C 70/42* (2013.01); *B29C 53/28* (2013.01); *B29C 53/36* (2013.01); *B29C 53/84* (2013.01);
(Continued)

(58) Field of Classification Search
None
See application file for complete search history.

(56) References Cited

U.S. PATENT DOCUMENTS 3,838,590 A * 10/1974 Van Dijk ............... B21D 13/10
                                                         72/307
5,211,901 A *  5/1993 Fray ........................ B29C 53/02
                                                        264/167
(Continued)

FOREIGN PATENT DOCUMENTS

CN        100418850        1/2007
DE       102004001078      7/2005
(Continued)

OTHER PUBLICATIONS

S. Clijsters, et al., In situ quality control of the selective laser melting process using a high-speed, real-time melt pool monitoring system, Int. J. Adv. Manuf. Technol (2014) 75:1089-1101. (Abstract only).

*Primary Examiner* — Joseph S Del Sole
*Assistant Examiner* — Manley L Cummins, IV
(74) *Attorney, Agent, or Firm* — Greer, Burns & Crain, Ltd.

(57) ABSTRACT

In a manufacturing method for a component, a clamping force is applied perpendicular to a surface of a first portion of a semifinished product containing reinforcing fibers via opposing first clamping surfaces of a first clamping tool. A clamping force is applied perpendicular to a surface of a second portion of the semifinished product via mutually opposing first clamping surfaces of a second clamping tool, spaced a first distance from the first clamping tool. A shaping device deforms a third portion of the semifinished product lying between the first and the second portions to form a first subportion and an opposite second subportion. The first distance is reduced to a second distance. A clamping force is applied perpendicular to the surfaces of the first and second subportions via a second clamping surface of the first
(Continued)

clamping tool and an opposite second clamping surface of the second clamping tool.

8 Claims, 3 Drawing Sheets

(51) Int. Cl.
    *B29C 53/36*     (2006.01)
    *B64C 1/06*     (2006.01)
    *B29C 53/84*     (2006.01)
    *B29C 53/28*     (2006.01)
    *B29L 31/30*     (2006.01)
    *B29C 70/54*     (2006.01)
    *B29C 70/44*     (2006.01)
    *B29C 70/46*     (2006.01)

(52) U.S. Cl.
    CPC .......... *B29D 99/0014* (2013.01); *B64C 1/064* (2013.01); *B29C 70/446* (2013.01); *B29C 70/462* (2013.01); *B29C 70/541* (2013.01); *B29C 70/542* (2013.01); *B29C 70/543* (2013.01); *B29C 2793/009* (2013.01); *B29C 2793/0027* (2013.01); *B29C 2793/0063* (2013.01); *B29L 2031/3076* (2013.01)

(56) References Cited

U.S. PATENT DOCUMENTS

| | | | |
|---|---|---|---|
| 2003/0057611 A1* | 3/2003 | Uytterhaeghe | B29C 70/541 264/422 |
| 2004/0041304 A1* | 3/2004 | Willden | B29C 70/342 264/324 |
| 2004/0265536 A1* | 12/2004 | Sana | B29C 70/345 428/119 |
| 2007/0023572 A1 | 2/2007 | Muller et al. | |
| 2007/0039284 A1* | 2/2007 | Munoz Royo | B64C 1/064 52/847 |
| 2008/0145634 A1 | 6/2008 | Hillermeier et al. | |
| 2010/0200156 A1* | 8/2010 | Lengsfeld | B29C 70/462 156/226 |
| 2011/0168324 A1* | 7/2011 | Ender | B29C 33/301 156/243 |
| 2014/0059813 A1* | 3/2014 | Soeffker | F16B 5/07 24/443 |
| 2014/0216638 A1* | 8/2014 | Vetter | B29C 70/081 156/227 |
| 2015/0174831 A1* | 6/2015 | Guez Charines | B29D 99/0003 428/121 |
| 2016/0098825 A1 | 4/2016 | Dave et al. | |
| 2016/0271884 A1 | 9/2016 | Herzog | |

FOREIGN PATENT DOCUMENTS

| | | | |
|---|---|---|---|
| DE | 102007062111 | | 7/2009 |
| DE | 102012011217 A1 | | 12/2013 |
| DE | 102013017792 A1 | | 4/2015 |
| EP | 1466718 A2 | | 10/2004 |
| EP | 1819503 | | 8/2007 |
| WO | WO 201001593 | * | 1/2013 |
| WO | 2015040433 A2 | | 3/2015 |
| WO | 2015056230 A1 | | 4/2015 |
| WO | 2016026663 A1 | | 2/2016 |

* cited by examiner

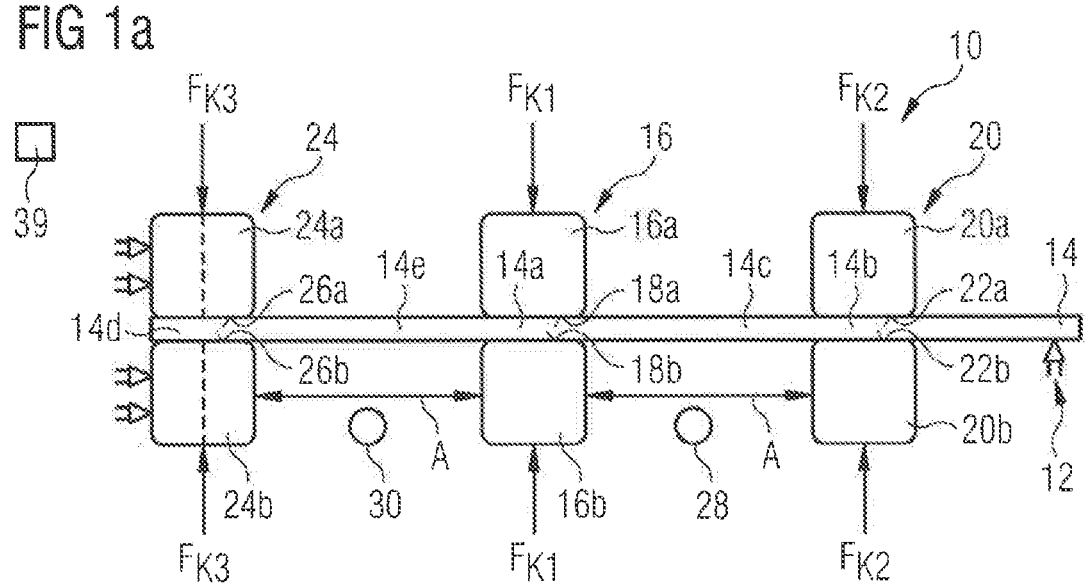
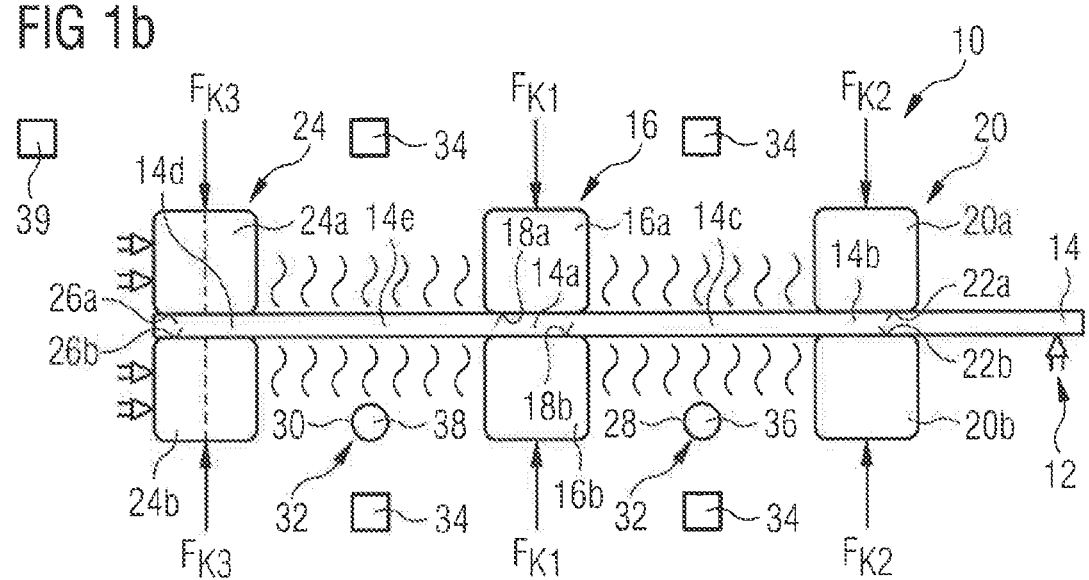

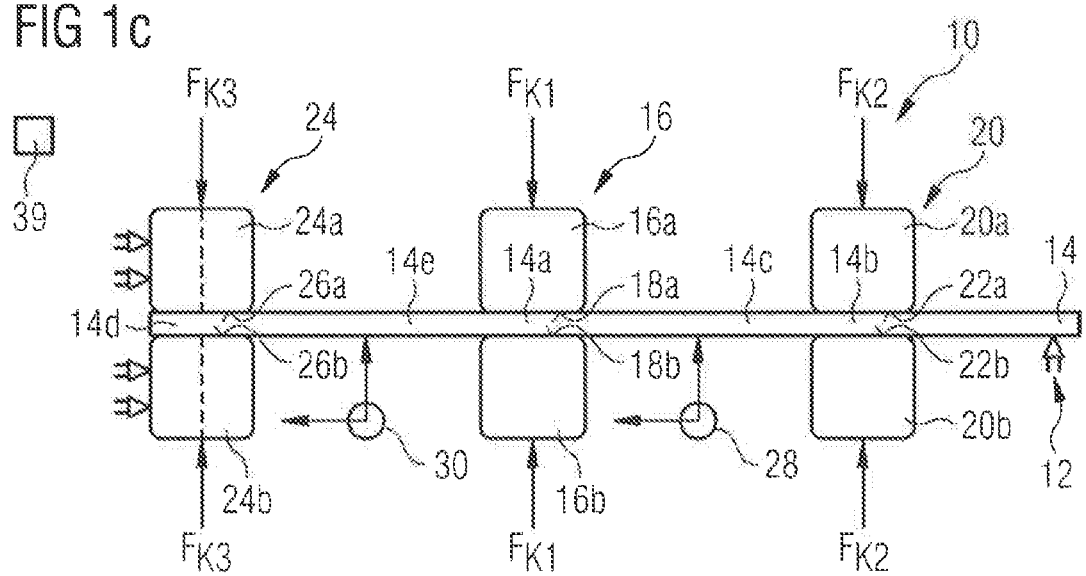
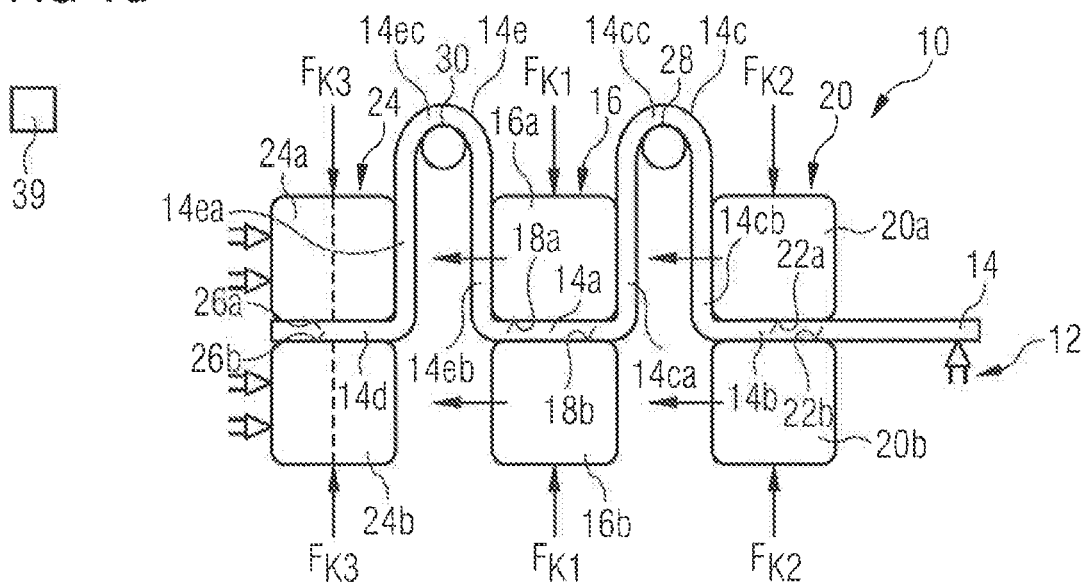

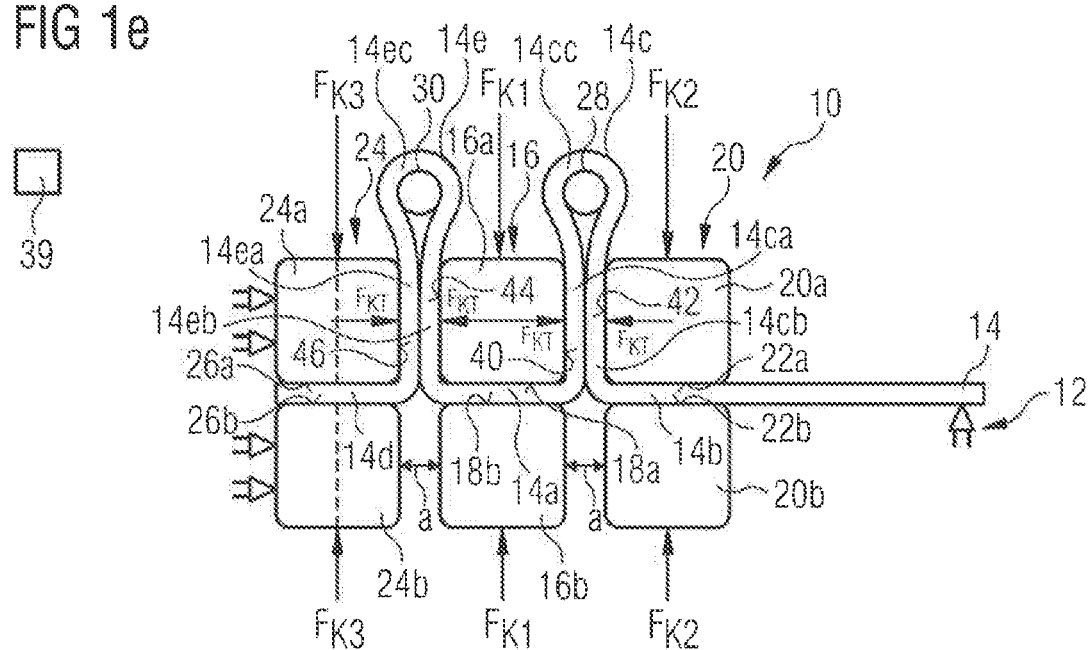
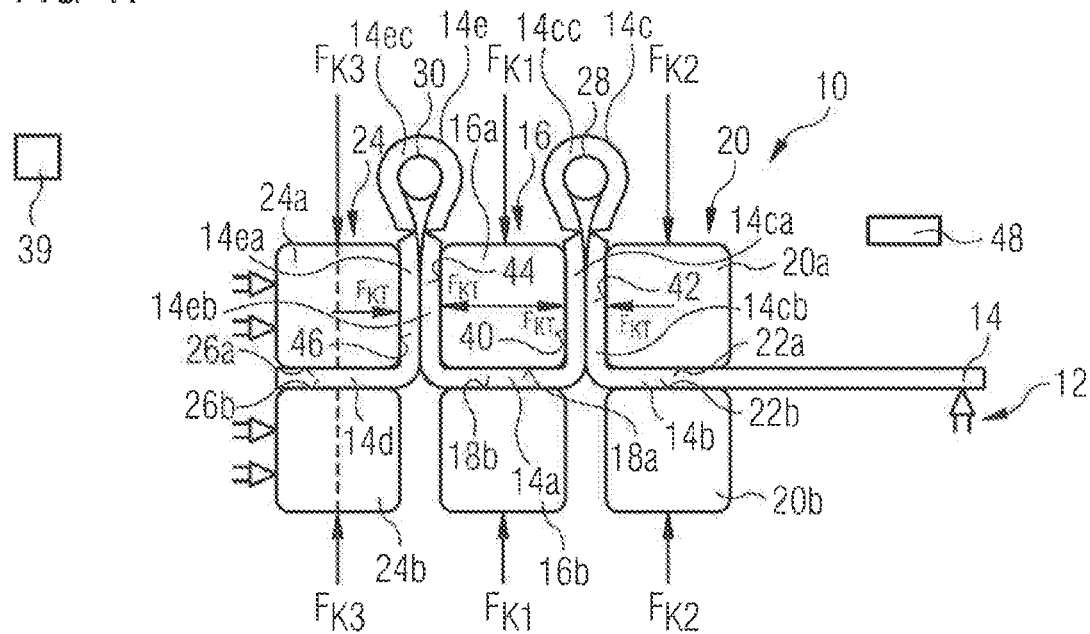

METHOD AND DEVICE FOR SERIES PRODUCTION OF COMPONENTS MADE OF A FIBER-REINFORCED COMPOSITE MATERIAL

CROSS-REFERENCES TO RELATED APPLICATIONS

This application claims the benefit of the German patent application No. 10 2015 211 670.0 filed on Jun. 24, 2015, the entire disclosures of which are incorporated herein by way of reference.

BACKGROUND OF THE INVENTION

The invention relates to a method and a device for manufacturing a component, particularly an aircraft component, made of a fiber-reinforced composite material.

In aircraft construction, there are increasing efforts to use components that are made in whole or in part of fiber-reinforced composite materials, for example glass fiber or carbon fiber reinforced plastics. For example, DE 10 2007 062 111 A1 describes a crossmember structure made of carbon-fiber-reinforced plastic that is used to support the individual panels of an aircraft floor system for separating a passenger cabin from a cargo hold arranged below the passenger cabin. Furthermore, it is known from DE 10 2004 001 078 A1 and CN 100418850, for example, to provide fuselage segments with a skin and reinforcing elements (e.g., ribs, stringers) made of fiber-reinforced composite materials.

When manufacturing aircraft structural components made of fiber-reinforced composite materials, a multilayer laminate may first be constructed from fiber prepregs. The fiber prepregs may comprise a woven fabric or laid scrim made of reinforcing fibers that are provided with a surface layer made of a hardenable plastic material. The laminate construction may be done manually or by automated means. The fiber prepregs may then be worked into a desired shape of a surface section forming an aircraft skin or of a reinforcing section forming a rib or stringer. Finally, the plastic material applied to the surfaces of the fibers is hardened under pressure and/or elevated temperature in an autoclave cycle, whereby a composite material is created with a matrix composed of a hardened plastic and reinforcing fibers embedded in the matrix. An autoclave process is particularly well suited to the make-to-order production of even complexly shaped components.

In contrast, EP 1819 503 B1 describes a method for continuously manufacturing structural profiles suitable for use as aircraft structural components. In this method, a multilayer fiber layer structure is first produced. For this purpose, dry fiber layers are unreeled from corresponding rolls and fed to a preforming tool that brings the fiber layers into a desired preform under pressure. The preformed stack of fiber layers produced in the preforming tool is impregnated with a mixture of an epoxy resin and a hardener, which is caused to undergo a partial reaction through the application of heat, which brings about an increase in the viscosity of the resin. The resin-impregnated stack of fiber layers is then heated further in a cycle press and pressurized, so that the resin gels and the crosslinking continues until dimensional stability is achieved. The resin is finally hardened completely in a tunnel kiln.

Throughout the entire process, the fiber layers, the stack of fiber layers and the resin-impregnated stack of fiber layers are continuously conveyed by means of corresponding extractors to and through the individual stations of the process. The cycle press is displaceably supported, such that it can be moved over a certain path together with the resin-impregnated stack of fiber layers to be pressed. As soon as the treatment of a portion of the resin-impregnated stack of fiber layers in the cycle press has been concluded, the cycle press is opened and moved counter to the direction of motion of the resin-impregnated stack of fiber layers until it has reached a corresponding position in which the cycle press can be closed again in order to treat another portion of the resin-impregnated stack of fiber layers. The continuous process described in EP 1819 503 B1 is suitable for the manufacture of structural profiles with a constant cross section in large quantities.

SUMMARY OF THE INVENTION

It is an object of the invention to provide a method and a device that enable the efficient series production of components, particularly aircraft components, made of a fiber-reinforced composite material.

In a method for manufacturing a component made of a fiber-reinforced composite material, a first portion of a semifinished product containing reinforcing fibers is subjected to a clamping force aligned perpendicular to a surface of the first portion of the semifinished product by means of opposing first clamping surfaces of a first clamping tool. The reinforcing fibers contained in the semifinished product may be embodied in the form of individual fibers or in the form of a fiber laid scrim or fiber weave and in the form of carbon fibers, for example. Preferably, the semifinished product contains, besides reinforcing fibers, a plastic material that forms a matrix in which the reinforcing fibers are embedded. The plastic material may be a thermoplastic plastic material or a hardenable plastic material, for example. For example, the semifinished product may contain a hardenable resin material, particularly an epoxy resin. In a preferred embodiment of the method, the semifinished product is embodied in the form of a fiber prepreg that comprises a woven fabric or laid scrim made of reinforcing fibers that are provided with a surface layer made of a hardenable plastic material.

The first clamping tool may comprise a first portion and a second portion opposite the first portion. The first clamping surfaces of the first clamping tool are then preferably formed by two opposing surfaces of the first and the second portion of the first clamping tool. In an idle state of the first clamping tool, the first and the second portion of the first clamping tool are preferably arranged at a first distance from one another that enables the first portion of the semifinished product to be positioned between the first clamping surfaces embodied on the first and the second portion of the first clamping tool. In a clamping state of the first clamping tool, in contrast, the first and the second portion of the first clamping tool are preferably arranged at a second distance from one another that is less than the first distance, whereby the first portion of the semifinished product is securely clamped between the first clamping surfaces of the first clamping tool. In principle, a portion of the first clamping tool may be rigidly fixed and the other portion of the first clamping tool may be movable relative to the rigidly fixed portion. Alternatively, however, it is also conceivable for the first clamping tool to be embodied with two portions that may be moved relative to one another and may be moved toward each other in opposite directions in order to securely clamp the first portion of the semifinished product between the first clamping surfaces embodied on the two portions of the first clamping tool.

A second portion of the semifinished product containing reinforcing fibers is subjected to a clamping force aligned perpendicular to a surface of the second portion of the semifinished product by means of opposing first clamping surfaces of a second clamping tool. In a direction parallel to the surfaces of the first and the second portion of the semifinished product, the second clamping tool is arranged at a first distance from the first clamping tool. As a result of the clamping force applied by the first and the second clamping tool, the semifinished product is held in a desired position.

Similarly to the first clamping tool, the second clamping tool may also comprise a first portion and a second portion opposite the first portion. The first clamping surfaces of the second clamping tool are then preferably formed by two opposing surfaces of the first and the second portion of the second clamping tool. In an idle state of the second clamping tool, the first and the second portion of the second clamping tool are preferably arranged at a first distance from one another that enables the second portion of the semifinished product to be positioned between the first clamping surfaces embodied on the first and the second portion of the second clamping tool. In a clamping state of the second clamping tool, in contrast, the first and the second portion of the second clamping tool are preferably arranged at a second distance from one another that is less than the first distance, whereby the second portion of the semifinished product is securely clamped between the first clamping surfaces of the second clamping tool. In principle, a portion of the second clamping tool may be rigidly fixed and the other portion of the second clamping tool may be movable relative to the rigidly fixed portion. Alternatively, however, it is also conceivable for the second clamping tool to be embodied with two portions that may be moved relative to one another and may be moved toward each other in opposite directions in order to securely clamp the second portion of the semifinished product between the first clamping surfaces embodied on the two portions of the second clamping tool.

A third portion of the semifinished product which lies between the first and the second portion is deformed by means of a shaping device arranged between the first and second clamping tool such that a first subportion and a second subportion opposite the first subportion is formed in the region of the third portion of the semifinished product. In other words, the shaping device bends or folds the third portion of the semifinished product such that two opposing deformed subportions of the semifinished product preferably extending substantially parallel to one another are formed in the region of the third portion of the semifinished product. In a preferred embodiment of the method, the shaping device is moved in a direction perpendicular to the surfaces of the first and second portion of the semifinished product in order to deform the third portion of the semifinished product, whereby the third portion of the semifinished product can be caused to take on a U-shape, for example.

During this deformation process, the first distance between the first and the second clamping tool is reduced to a second distance; that is, the two clamping tools are moved closer together. In particular, the distance between the first and the second clamping tool is reduced in such a way as to enable the semifinished product to be deformed in the region of its third portion without significantly reducing the thickness of the semifinished product, i.e., the dimension of the semifinished product in a direction perpendicular to its surface. As a result, it is ensured that the mechanical properties of the semifinished product or of a component ultimately made from the semifinished product are not excessively impaired by the deformation process. The reduction of the distance between the two clamping tools may be brought about by moving at least one of the clamping tools in the direction parallel to the surfaces of the first and the second portion of the semifinished product toward the other clamping tool.

Finally, the first and the second subportion of the semifinished product, which are formed by deforming the third portion of the semifinished product, are subjected to a clamping force aligned perpendicular to surfaces of the first and the second subportion of the semifinished product by means of a second clamping surface of the first clamping tool and a second clamping surface of the second clamping tool opposite the second clamping surface of the first clamping tool. The two subportions of the semifinished product can be pressed against one another as a result of the clamping force applied via the second clamping surfaces of the two clamping tools, thus resulting in a two-layered semifinished product region.

When the shaping device is moved in a direction perpendicular to the surfaces of the first and the second portion of the semifinished product in order to deform the third portion of the semifinished product, as a result of the interaction of the second clamping surfaces of the two clamping tools, the two arms of the third section of the semifinished product caused to take on a U-shape are pressed against one another, thus resulting in a double-layered semifinished product region substantially perpendicular to the surfaces of the first and the second portion of the semifinished product. The second clamping surface of the first clamping tool then preferably extends perpendicular to the first clamping surface of the first clamping tool. Similarly, the second clamping surface of the second clamping tool then preferably extends perpendicular to the first clamping surface of the second clamping tool.

The method described above enables the fully automated production of components of consistently high quality made of fiber-reinforced composite materials.

Furthermore, the method makes it possible to reduce the number of production steps required for the manufacture of the components. The required time and thus the costs of the manufacture of the components can thus be reduced. The method is therefore especially well suited to the manufacture of aircraft structural components. Particularly, the method can be used advantageously to manufacture ribs, stringers other structural profiles of an aircraft primary structure.

In principle, it is possible to use only two clamping tools and one shaping device in the method for manufacturing a component made of a fiber-reinforced composite material. Preferably, however, the method is carried out using a plurality of clamping tools and a plurality of shaping devices. Using the method, several components can be manufactured simultaneously in a fully automated manner and of consistently high quality from a single appropriately dimensioned semifinished product that is therefore more cost-effective than several smaller semifinished products. The method is then distinguished by an especially high level of efficiency.

The semifinished product may be panel-shaped, for example. A semifinished product embodied in the form of a fiber prepreg can then be efficiently produced with appropriate dimensions using a tape lamination machine, for example. Before being deformed, the semifinished product is preferably displaceably supported on a semifinished product bed, it being possible to support the semifinished product on the semifinished product bed in a rolling or sliding manner, for example, as needed. The semifinished product can then be easily brought into a desired position on the semifinished product bed before it is fixed in its position through the interaction of the first clamping surfaces of the first and the second clamping tool.

The first clamping surfaces of the first and the second clamping tool may extend substantially parallel to a longitudinal axis of a component to be produced from the semifinished product. In addition, or alternatively, the shaping device may also extend substantially parallel to a longitudinal axis of a component to be produced from the semifinished product. Elongate structural profiles—such as ribs, stringers or the like that can be used as the primary structural component in an aircraft—can then be produced especially well.

The shaping device is preferably embodied in the form of a rod. Furthermore, the shaping device may be displaceably supported in the region of its ends opposing a longitudinal axis of the shaping device. In particular, the shaping device may be supported in the region of its ends such that it may carry out a movement in a direction perpendicular to a surface of the third portion of the semifinished product. The third portion of the semifinished product may then be deformed by means of a guided movement of the shaping device in a direction perpendicular to the surface of the third portion of the semifinished product.

In a preferred embodiment of the method for manufacturing a component made of a fiber-reinforced composite material, upon a reduction of the first distance between the first and the second clamping tool to the shorter second distance as a result of the movement of at least one clamping tool in the direction parallel to the surfaces of the first and the second portion of the semifinished product, the shaping device is entrained in the direction parallel to the surfaces of the first and the second portion of the semifinished product. The shaping device then does not perform any guided movement in the direction parallel to the surfaces of the first and the second portion of the semifinished product. Rather, the shaping device is supported in this direction only so as to be freely movable, so that the shaping device can be entrained synchronously when the at least one clamping tool is moved in the direction parallel to the surfaces of the first and the second portion of the semifinished product.

The semifinished product may be heated by means of a heating device at least in the region of its third portion before and/or during the deformation of the third portion of the semifinished product. The heating device is preferably controlled such that no hardening of the plastic material contained in the semifinished product takes place, but rather that the viscosity of the plastic material contained in the semifinished product is reduced. This enables easier deformation of the semifinished product. The heating device may comprise a heat source that is embodied, for example, as a radiant heater, particularly as an infrared radiator, or another suitable heat source. Alternatively, or in addition to that, the heating device may comprise a heating channel that is formed in the shaping device and through which a heated fluid can flow.

During the deformation of the third portion of the semifinished product, preferably an intermediate portion is formed that lies between the first and the second subportion and is in contact with the shaping device. When the intermediate portion of the semifinished product is brought into a U-shape by means of a shaping device embodied in the form of a rod, for example, the intermediate portion is preferably formed by a region of the third portion of the semifinished product that lies between the legs of the U-shape, is curved, and rests on the shaping device. After the loading of the first and the second subportion of the semifinished product with a clamping force aligned perpendicular to the surfaces of the first and the second subportion of the semifinished product by means of the second clamping surface of the first clamping tool and the second clamping surface of the second clamping tool opposite the second clamping surface of the first clamping tool, the intermediate portion is preferably separated by means of a cutting device from the first and the second subportion. The intermediate portion can then be detached from the shaping device and disposed of or otherwise used. The cutting device may be an ultrasonic cutting device, for example.

Finally, after the loading of the first and the second subportion of the semifinished product with a clamping force aligned perpendicular to the surfaces of the first and the second subportion of the semifinished product by means of the second clamping surface of the first clamping tool and the second clamping surface of the second clamping tool opposite the second clamping surface of the first clamping tool, the semifinished product may be cut into a desired shape by means of a cutting device substantially parallel to a longitudinal axis of a component to be produced from the semifinished product. It is possible to use only one cutting device for separating the intermediate portion from the first and the second subportion and for cutting the semifinished product substantially parallel to a longitudinal axis of the component to be produced. If desired, however, different cutting devices may also be used for these purposes.

A device for manufacturing a component made of a fiber-reinforced composite material comprises a first clamping tool that is adapted to load a first portion of a semifinished product containing reinforcing fibers by means of mutually opposing first clamping surfaces with a clamping force aligned perpendicular to a surface of the first portion of the semifinished product. Furthermore, the device comprises a second clamping tool, which adapted to load a second portion of a semifinished product containing reinforcing fibers by means of mutually opposing first clamping surfaces with a clamping force aligned perpendicular to a surface of the second portion of the semifinished product. The second clamping tool is arranged in a direction parallel to the surfaces of the first and the second portion of the semifinished product at a first distance from the first clamping tool.

A shaping device of the device arranged between the first and the second clamping tool is adapted to deform a third portion of the semifinished product lying between the first and the second portion in order to form a first subportion and a second subportion opposite the first subportion. Finally, the device comprises a control device, which is adapted to control the operation of the first and the second clamping tool such that, through the movement of at least one clamping tool in the direction parallel to the surfaces of the first and the second portion of the semifinished product, the first distance between the first and the second clamping tool is reduced to a second distance, and the first and the second subportions of the semifinished product are loaded by means of a second clamping surface of the first clamping tool and a second clamping surface of the second clamping tool opposite the second clamping surface of the first clamping tool with a clamping force that is aligned perpendicular to surfaces of the first and the second subportion of the semifinished product.

The device preferably further comprises a semifinished product bed that is adapted to displaceably support the semifinished product which is in particular plate-shaped before its deformation. The first clamping surfaces of the first and the second clamping tool and/or the shaping device may extend substantially parallel to a longitudinal axis of a component to be produced from the semifinished product.

The shaping device may be embodied in the form of a rod. Furthermore, the shaping device may be displaceably supported in the region of its ends. Finally, the shaping device may be adapted to deform the third portion of the semifinished product by means of a movement in a direction perpendicular to a surface of the third portion of the semifinished product.

Furthermore, the shaping device of the device, upon a reduction of the first distance between the first and the second clamping tool to the second distance as a result of the movement of at least one clamping tool in the direction parallel to the surfaces of the first and the second portion of the semifinished product, may be adapted to be entrained in the direction parallel to the surfaces of the first and the second portion of the semifinished product.

The device may further comprise a heating device, which may be adapted to heat the semifinished product before and/or during the deformation of the third portion of the semifinished product in the region of its third portion. The heating device may comprise a radiant heater. In addition, or alternatively to that, the heating device may comprise a heating channel which is formed in the shaping device and which is adapted to be flown through which a heated fluid.

The device is preferably equipped with a cutting device that is adapted to separate an intermediate portion that lies between the first and the second subportion, is in contact with the shaping device, and is formed during the deformation of the third portion of the semifinished product, from the first and the second subportion, after the loading of the first and the second subportion of the semifinished product with a clamping force aligned perpendicular to surfaces of the first and the second subportion of the semifinished product.

Finally, the device may comprise a cutting device that is adapted to cut the semifinished product after the loading of the first and the second subportion with a clamping force aligned perpendicular to surfaces of the first and the second subportion of the semifinished product substantially parallel to a longitudinal axis of a component to be produced from the semifinished product into a desired shape.

The method described above and/or the device described above may be used for manufacturing an aircraft structural component, particularly a stringer.

BRIEF DESCRIPTION OF THE DRAWINGS

Preferred embodiments of the invention will now be explained in greater detail with reference to the enclosed schematic drawings, of which FIGS. 1a to f show a device and a method for manufacturing a component made of a fiber-reinforced composite material in a first operating state.

DETAILED DESCRIPTION OF THE PREFERRED EMBODIMENTS

FIGS. 1a to f show a device 10 for manufacturing a component made of a fiber-reinforced composite material. The device 10 comprises a semifinished product bed 12 that makes it possible to support a semifinished product 14, which is plate-shaped in the exemplary embodiment illustrated in the figures, in a sliding and displaceable manner in a direction parallel to a surface of the semifinished product 14. The exemplary semifinished product 14 shown in the figures is a fiber prepreg that comprises a woven fabric or laid scrim made of reinforcing fibers, particularly carbon fibers, which are provided with a surface layer of a hardenable plastic material, particularly an epoxy resin.

The device 10 further comprises a first clamping tool 16 with a first portion 16a and a second portion 16b. A respective first clamping surface 18a, 18b is embodied on the first and the second portion 16a, 16b of the first clamping tool 16. The first clamping surfaces 18a, 18b of the first clamping tool 16 lie opposite one another and extend substantially parallel to a surface of a first portion 14a of the semifinished product 14. Furthermore, a second clamping tool 20 is provided that also has a first portion 20a and a second portion 20b. A respective first clamping surface 22a, 22b is embodied on the first and the second portion 20a, 20b of the second clamping tool 20. The first clamping surfaces 22a, 22b of the second clamping tool 20 lie opposite one another and extend substantially parallel to a surface of a second portion 14b of the semifinished product 14. In the operating state of the device 10 shown in FIG. a, the second clamping tool 20 is arranged at a first distance A from the first clamping tool 16. A third portion 14c of the semifinished product 14 thus extends in exposed fashion between the first and the second portion 14a, 14b of the semifinished product 14.

Finally, the device 10 in the exemplary embodiment shown in the figures has a third clamping tool 24. The third clamping tool 24 also comprises a first and a second portion 24a, 24b, on each of which a first clamping surface 26a, 26b is formed. The first clamping surfaces 26a, 26b of the third clamping tool 24 lie opposite one another and extend substantially parallel to a surface of a fourth portion 14d of the semifinished product 14. Similarly to the second clamping tool 20, in the operating state of the device 10 shown in FIG. 1a, the third clamping tool 24 is also arranged at a first distance A from the first clamping tool 16. A fifth portion 14e of the semifinished product 14 thus extends in exposed fashion between the first and the fourth portion 14a, 14d of the semifinished product 14.

The first and the second portion 16a, 16b, 20a, 20b, 24a, 24b of the clamping tools 16, 20, 24 are each movable relative to one another in opposite directions substantially perpendicular to the surfaces of the first, the second and the fourth portion 14a, 14b, 14d of the semifinished product 14. In an idle state of the first, the second and the third clamping tool 16, 20, 24, the respective first and second portions 16a, 16b, 20a, 20b, 24a, 24b of the clamping tools 16, 20, 24 are arranged at a distance from one another that makes it possible to position the corresponding portions 14a, 14b, 14d of the semifinished product 14 between the first clamping surfaces 18a, 18b, 22a, 22b, 26a, 26b of the clamping tools 16, 20, 24. By contrast, in a clamping state of the clamping tools 16, 20, 24 illustrated in FIG. 1a, the respective first and second portions 16a, 16b, 20a, 20b, 24a, 24b of the clamping tools 16, 20, 24 are arranged at a second distance from one another that is shorter than the first distance, whereby the first clamping surfaces 18a, 18b, 22a, 22b, 26a, 26b of the clamping tools 16, 20, 24 load the portions 14a, 14b, 14d of the semifinished product 14 respectively with a clamping force FK1, FK2, FK3 aligned perpendicular to the surfaces of the portions 14a, 14b, 14d of the semifinished product 14. As a result, the semifinished product 14 is held in a desired position on the semifinished product bed 12.

The device 10 further comprises a first shaping device 28, which is arranged between the first and the second clamping tool 16, 20. A second shaping device 30 is positioned between the first and the third clamping tool 16, 24. The first and the second shaping device 28, 30 are embodied in the form of a hollow rod which, similarly to the first clamping surfaces 18a, 18b, 22a, 22b, 26a, 26b of the clamping tools 16, 20, 24, extends substantially parallel to a longitudinal axis of a component to be produced from the semifinished product 14. Furthermore, the first and the second shaping device 28, 30 are displaceably supported in the region of their ends.

Finally, the device 10 comprises a heating device 32 that makes it possible to heat the semifinished product 14 in the region of its third and its fifth portion 14c, 14e. The heating device 32 comprises a plurality of radiant heaters 34 which, as illustrated in FIG. 1b, emit radiant heat to the third and the fifth portion 14c, 14e of the semifinished product 14. Furthermore, the heating device 32 comprises heating channels 36, 38 which are formed in the first and the second shaping device 28, 30 and through each of which a heated fluid flows. The operation of the heating device 32 is controlled such that no hardening of the plastic material contained in the semifinished product 14 takes place, but rather that the viscosity of the plastic material contained in the semifinished product 14 is reduced. As a result, the semifinished product 14 can be deformed more easily, as will be described below.

As can be seen from FIGS. 1c and 1d, during the operation of the device 10, which is controlled by means of a control device 39, the third portion 14c of the semifinished product 14 is deformed by means of the first shaping device 28 in order to form a first subportion 14ca and a section subportion 14cb opposite the first subportion 14ca. For this purpose, the first shaping device 28 performs a guided movement in a direction perpendicular to a surface of the third portion 14c of the semifinished product 14. In the exemplary embodiment shown in the figures, the first shaping device 28 is moved upward in the vertical direction. Accordingly, the fifth portion 14e of the semifinished product 14 is deformed in order to form a third subportion 14ea and a fourth subportion 14eb opposite the third subportion 14ea. For this purpose, the second shaping device 30 performs a guided movement in a direction perpendicular to a surface of the fifth portion 14e of the semifinished product 14, i.e., the second shaping device 30, just like the first shaping device 28, is moved upward in the vertical direction in the exemplary embodiment shown in the figures.

Synchronously with the movement of the first shaping device 28 for the deformation of the third portion 14c of the semifinished product 14, the first distance A between the first and the second clamping tool 16, 20 is reduced through movement of the second portion 14a, 14b of the semifinished product 14 toward the first clamping tool 16 to a second distance a, see FIGS. 1d and 1e. Similarly, synchronously with the movement of the second shaping device 30 for the deformation of the fifth portion 14e of the semifinished product 14, the first distance A between the first and the third clamping tool 16, 24 is reduced through movement of the first clamping tool 16 in the direction parallel to the surfaces of the first and the fourth portion 14a, 14d of the semifinished product 14 toward the third clamping tool 24 supported rigidly in the direction parallel to the surfaces of the first and the fourth portion 14a, 14d of the semifinished product 14 to a second distance a.

In this way, it is ensured that the thickness of the semifinished product 14 in the region of its third and its fifth portion 14c, 14e remains substantially constant in spite of the deformation by means of the first and the second shaping device 28, 30.

During the reduction of the first distance A between the first and the second clamping tool 16, 20 to the second distance a, the first shaping device 28, due to its being supported in a freely displaceable manner in the direction parallel to the surfaces of the first and the second portion 14a, 14b of the semifinished product 14, is entrained with the movement of the second clamping tool 20 toward the first clamping tool 16. In a similar way, during the reduction of the first distance A between the first and third clamping tools 16, 24 to the second distance a, the second shaping device 30, due to its being supported in a freely displaceable manner in the direction parallel to the surfaces of the first and the second portion 14a, 14b of the semifinished product 14, is also entrained with the movement of the first clamping tool 16 toward the third clamping tool 24.

As soon as the distance between the first and the second clamping tool 16, 20 has been reduced to the second distance a, the first and the second subportion 14ca, 14cb of the semifinished product 14 are loaded by means of a second clamping surface 40 of the first clamping tool 16 and a second clamping surface 42 of the second clamping tool 20 opposite the second clamping surface 40 of the first clamping tool 16 with a clamping force FKT aligned perpendicular to the surfaces of the first and the second subportion 14ca, 14cb of the semifinished product 14. As a result, the first and the second subportion 14ca, 14cb of the semifinished product 14 are pressed against one another, whereby a double-layered semifinished product region extending substantially perpendicular to the first and the second portion 14a, 14b of the semifinished product 14 is formed in the region of the third portion 14c of the semifinished product 14.

In a similar manner, the third and the fourth subportion 14ea, 14eb of the semifinished product 14 are loaded by means of a third clamping surface 44 of the first clamping tool 16 and a second clamping surface 46 of the third clamping tool 24 opposite the first clamping tool 16 with a clamping force FKT aligned perpendicular to the surfaces of the third and the fourth subportions 14ea, 14eb of the semifinished product 14 in order to form, in the region of the fifth portion 14e of the semifinished product 14, a double-layered semifinished product region extending substantially perpendicular to the first and the fourth portion 14a, 14d of the semifinished product 14.

By means of the exemplary device 10 shown in the figures, the third portion 14c of the semifinished product 14 is deformed in a U-shaped manner, the first and the second subportion 14ca, 14cb of the semifinished product 14 defining the arms of the U-shape. Furthermore, an intermediate portion 14cc occurs which lies between the first and the second subportion 14ca, 14cb and is in contact with the first shaping device 28. Similarly, the fifth portion 14e of the semifinished product 14 is deformed in a U-shaped manner, the third and the fourth subportion 14ea, 14eb of the semifinished product 14 defining the arms of the U-shape, and another intermediate portion 14ec occurs which lies between the third and the fourth subportion 14ea, 14eb and is in contact with the second shaping device 30.

After the loading of the first and the second subportion 14ca, 14cb of the semifinished product 14 with a clamping force aligned perpendicular to the surfaces of the first and the second subportion 14ca, 14cb, the intermediate portion 14cc is preferably separated by means of a cutting device 48 embodied in the form of an ultrasonic cutting device from the first and the second subportion 14ca, 14cb, see FIG. 1f. In a similar manner, after the loading of the third and the fourth subportion 14ea, 14eb of the semifinished product 14 with a clamping force aligned perpendicular to the surfaces of the third and the fourth subportion 14ea, 14eb, the other intermediate portion 14ec is separated by means of the cutting device 48 from the third and the fourth subportion 14ea, 14eb. The intermediate portion 14cc and the other intermediate portion 14ec can then be detached from the first and the second shaping device 28, 30, respectively, and disposed of or otherwise used.

Finally, the semifinished product 14 is also cut into a desired shape by means of the cutting device 48 substantially parallel to a longitudinal axis of a component to be produced from the semifinished product 14. In the arrangement shown in the figures, these cuts are made after the releasing of the clamping forces applied by the clamping tools 16, 20, 24 in the region of the first, the second and the fourth portion 14a, 14b, 14d of the semifinished product 14 in order to subdivide the semifinished product 14 into corresponding sub-semifinished products that can then ultimately be further processed through hardening of the plastic material contained in sub-semifinished products into aircraft structural components, particularly stringers.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a component made of a fiber-reinforced composite material, comprising the steps:
    loading a first portion of a semifinished product containing reinforcing fibers with a clamping force aligned perpendicular to a surface of the first portion of the semifinished product by means of mutually opposing first clamping surfaces of a first clamping tool,
    loading a second portion of the semifinished product containing reinforcing fibers with a clamping force aligned perpendicular to a surface of the second portion of the semifinished product by means of mutually opposing first clamping surfaces of a second clamping tool, which is arranged in a direction parallel to the surfaces of the first and the second portion of the semifinished product at a first distance from the first clamping tool,
    deforming a third portion of the semifinished product that lies between the first and the second portion in order to form a first subportion and a second subportion opposite the first subportion by a shaping device arranged between the first and the second clamping tool,
    while deforming the third portion with the shaping device to form the first and second subportions, reducing the first distance between the first and the second clamping tool to a second distance through movement of at least one of the first or second clamping tools in the direction parallel to the surfaces of the first and the second portion of the semifinished product while the shaping device is positioned between the first and the second clamping tool, and
    loading the first and the second subportion of the semifinished product with a clamping force aligned perpendicular to surfaces of the first and the second subportion of the semifinished product by means of a second clamping surface of the first clamping tool and a second clamping surface of the second clamping tool opposite the second clamping surface of the first clamping tool.

2. The method according to claim 1, wherein the semifinished product is displaceably supported on a semifinished product bed.

3. The method according to claim 1, wherein at least one of the first clamping surfaces of the first or second clamping tools and the shaping device extends substantially parallel to a longitudinal axis of the semifinished product.

4. The method according to claim 1, wherein the third portion of the semifinished product is deformed by a guided movement of the shaping device, which is embodied in the form of a rod having a first end and a second end, wherein both the first end and the second end are displaceably supported in a direction perpendicular to a surface of the third portion of the semifinished product.

5. The method according to claim 1, wherein the shaping device, upon the reduction of the first distance between the first and the second clamping tool to the second distance as a result of the movement of the at least one of the first or second clamping tools in the direction parallel to the surfaces of the first and the second portion of the semifinished product, is entrained in the direction parallel to the surfaces of the first and the second portion of the semifinished product.

6. The method according to claim 1, wherein the semifinished product is heated at least one of before or during the deformation of the third portion of the semifinished product by a heating device at least in the region of the third portion of the semifinished product, the heating device comprising at least one of a radiant heater or a heating channel, the heating channel being formed in the shaping device and being configured to allow a heated fluid to flow through the heating channel.

7. The method according to claim 1, wherein, during the deformation of the third portion of the semifinished product, an intermediate portion that lies between the first and the second subportion and is in contact with the shaping device is formed which, after loading of the first and the second subportion of the semifinished product with the clamping force aligned perpendicular to surfaces of the first and the second subportion of the semifinished product, is separated from the first and the second subportion via a cutting device.

8. The method according to claim 1, wherein the semifinished product is cut after the loading of the first and the second subportion of the semifinished product with the clamping force aligned perpendicular to surfaces of the first and the second subportion of the semifinished product.

* * * * *